United States Patent [19]

Stern

[11] Patent Number: 4,714,027

[45] Date of Patent: Dec. 22, 1987

[54] KNOCKDOWN FURNITURE

[76] Inventor: Kurt J. Stern, 337 N. Crescent Heights Blvd., Los Angeles, Calif. 90048

[21] Appl. No.: 919,202

[22] Filed: Oct. 14, 1986

[51] Int. Cl.$^4$ ............................................. A47B 47/00
[52] U.S. Cl. .................................. 108/111; 108/101; 446/128; 217/65
[58] Field of Search ................ 108/111, 101; 446/106, 446/108, 118, 128, 114, 115; 217/13, 42, 43 R, 45, 17, 65; 211/186, 189, 153

[56] References Cited

U.S. PATENT DOCUMENTS

| 1,300,671 | 4/1919 | Still | 217/65 |
|---|---|---|---|
| 1,480,939 | 1/1924 | Hand | 211/189 |
| 1,815,858 | 7/1931 | Lifschultz | 211/182 |
| 1,935,542 | 11/1933 | Burnsell | 446/118 |
| 4,127,072 | 11/1978 | LePon | 108/111 |

FOREIGN PATENT DOCUMENTS

| 626556 | 4/1963 | Belgium | 108/111 |
|---|---|---|---|
| 0108903 | 2/1968 | Denmark | 446/128 |
| 1256072 | 2/1961 | France | 446/128 |

Primary Examiner—Peter A. Aschenbrenner
Assistant Examiner—Gerald A. Anderson
Attorney, Agent, or Firm—Elliott N. Kramsky

[57] ABSTRACT

An article of furniture is formed by a plurality of interlocking elements. Horizontally-arranged shelves include mortises formed between notches in adjacent slats. The slats are separated by longitudinal spacings within the shelves. Vertical supports which terminate in mating tenons are arranged perpendicular to the shelves. Units for housing drawers are provided that include top and bottom sets of rails for slidable mounting between pairs of shelves. Bookend arrangements that include protruding dowels and stops are slidably secured within the spacings between the slats of the shelves. The furniture requires no external fasteners and is totally compatible with knockdown assembly and disassembly.

6 Claims, 8 Drawing Figures

KNOCKDOWN FURNITURE

BACKGROUND

1. Field of the Invention

The present invention relates to furniture and modular elements of construction therefor. More particularly, this invention pertains to attractive and coventient "knockdown" furniture constructions.

2. Background of the Prior Art

Furniture -both home and office- is an unavoidable complex of design and utility. Thus, advances in one aspect of the furniture manufacture/design art are often stymied, in terms of market acceptance, by flaws in the other aspect.

So-called knockdown furniture is a good example of this conflict. The utility of such furniture is obvious. Furniture that may be readily disassembled and reassembled is easily stored and transported, saving both transportation and storage charges.

While a promising concept, present day knockdown furniture is generally limited to a single possible configuration. Further, the utility knockdown furniture is limited by the common use of fasteners, including nails, nuts and screws. Such fasteners complicate both assembly and disassembly. Further, by substantially increasing the number of parts of the furniture "kit", the task of the user is substantially complicated. The fasteners must be carefully catalogued, understood and stored. Often relatively complex directions must also be preserved to avoid the furniture from becoming a pile of sticks in the hand of an "all thumbs" weekend volunteer.

The use of fasteners limits the ability of the assembler to improvise different designs with conventional knockdown furniture. The incorporation of fasteners into knockdown furniture designs, for the purpose of stabilizing the joints thereof, has thus significantly limited its present utility.

SUMMARY

The present invention addresses and overcomes the foregoing and additional shortcomings of the prior art by providing a novel article of furniture. The article includes a plurality of elements. Each of such elements includes at least one means for interlocking. The elements are arranged so that the article of furniture includes no additional fasteners.

The preceding and other features and advantages will become further apparent from the description that follows. The description is accompanied by a set of drawing figures. Numerals of the figures, corresponding to those of the written description, point out the features of this invention, like numerals referring to like features of the invention throughout.

DETAILED DESCRIPTION

Figure 1:
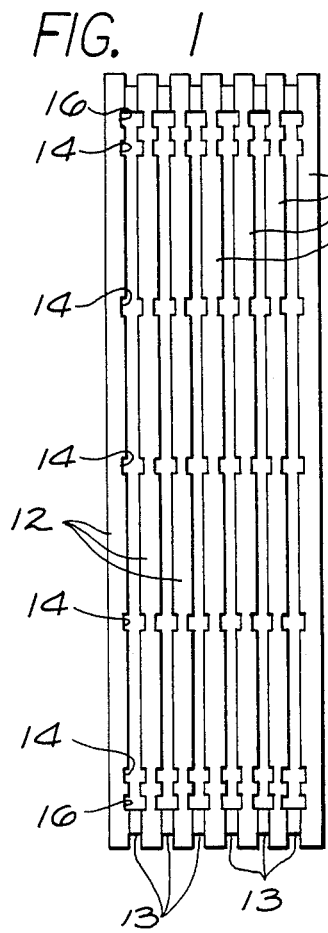
FIG. 1 is a plan view of a horizontal shelf element in accordance with the present invention.

Turning to the drawings, FIG. 1 is a plan view of a shelf element 10 in accordance with the invention. the shelf 10, as well as the other elements for constructing furniture in accordance with the invention, is preferably a variety of wood. However, constructions of formed sheet metal, molded plastic and fiberglass with injected foam are also envisioned. Examples of preferred materials include hardwoods such as oak, walnut, rosewood, ebony and maple.

Each shelf element 10 comprises a plurality of longitudinally arranged slats 12 with open spacings there between. Slat spacers 13 adjacent the ends of the slats 12 retain proper spacing throughout their lengths. As will be seen, the slat arrangement of the shelf 10 is functional while assuring that the resulting furniture constructions possess aesthetic continuity. It is contemplated that a shelves of differing sizes will be compatibly (both functionally and aesthetically) combined in various furniture pieces. Such compatibility will become apparent from the regular symmetries that are incorporated into the various elements disclosed herein. Presently, shelves of the following lengths: twenty-three, thirty-five, forty-seven, and fifty-nine inches and the following widths: eleven and one-half, sixteen and onehalf and twenty-one and one-half inches, are contemplated and may be commingled within a furniture construction "kit" or the like.

A number of mortises are formed along the length of the shelf 10 by facing notches 14 in the sides of adjacent slats 12. The notches for forming the mortises are regularly spaced along the length of the shelf 10. Additionally, notches 16 are formed outside each set of regularly-spaced notches and adjacent the opposed end of the shelf 10. The utility of the arrangement of closely-spaced mortises near the end of a shelf will become particularly apparent with regard to the furniture construction shown in FIG. 8.

The slats 12 protrude beyond the shelf spacers 13 at the ends of the shelf 10. This provides aesthetic continuity to furniture designs in accordance with this invention as is evident from the constructions of FIGS. 7 and 8.

Figure 2:
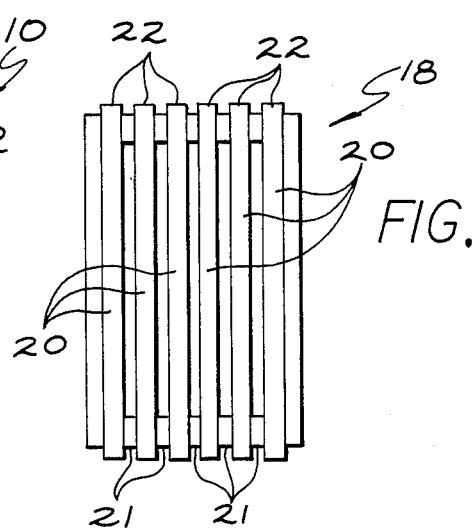
FIG. 2 is a vertical support element in accordance with the invention in elevation.

FIG. 2 is an elevation view of a vertical support element 18. The support 18 similarly comprises a plurality of (upright) slats 20. As before, spacing elements 21 adjacent ends of the support 18 assure that the slats 20 are properly spaced throughout their lengths. Similarly, the ends of the slats 20 extend beyond the spacers 21. The extensions of the slats 20 of the support 18 provide a plurality of tenons 22 for forming stable interlocking mortise and tenon joints in furniture pieces constructed with by means of the elements disclosed herein. The arrangement of such joints will become further apparent from FIG. 6 infra.

Figure 3:
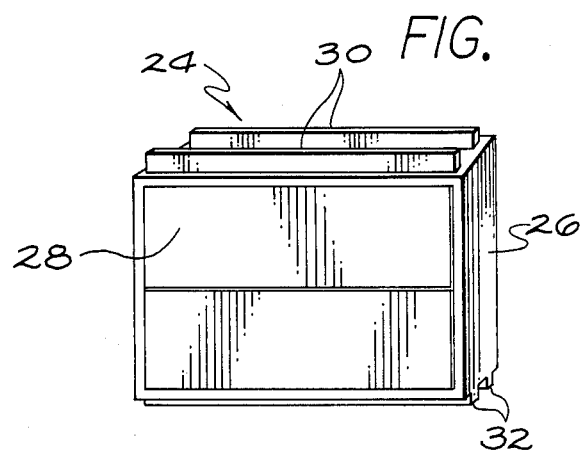
FIG. 3 is a perspective view of a drawer unit for incorporation into a modular furniture unit in accordance with the invention.

FIG. 3 is a drawer element 24 for incorporation into furniture pieces in accordance with the invention. The drawer element 24 includes generally boxlike frame 26 that is adapted to receive one or more drawers 28. Pairs of parallel rails are fixed to the top and the bottom of the drawer element 24 respectively. The rails are arranged to match the spaced between the slats of shelves to permit the drawer elements 24 to be slidably secured within constructions formed in accordance with this invention.

Figure 4:
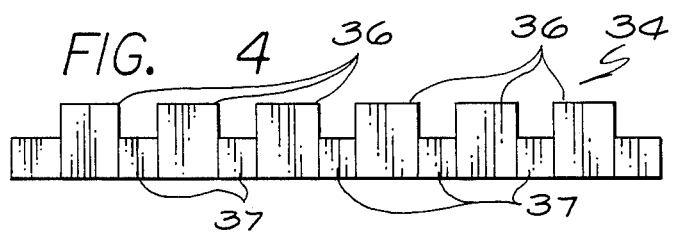
FIG. 4 is a foot element in accordance with the invention.

FIG. 4 is an elevation view of a foot element 34. The foot 34 comprises a plurality of upright tenons 36 interspersed with spacers 37. The foot element 34 acts to elevate the bottom shelf of furniture pieces in accordance with the invention so that such constructions needn't sit directly upon a floor.

Figure 5:
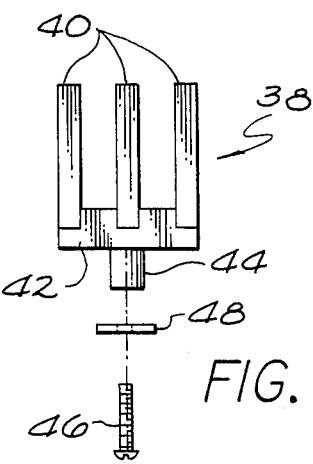
FIG. 5 is an exploded view of a bookend element for incorporation into a modular furniture unit in accordance with the invention.

FIG. 5 is an exploded view of a bookend 38 especially adapted for incorporation into furniture pieces in accordance with this invention. The bookend 38 comprises a plurality of upright slats 40, the bottom ends of which are fixed to a transversely-oriented bottom member 42. A dowel 44 protrudes downwardly from the bottom member 42 and includes a hole for accepting a screw 46 or other conventional fastener. A plate 48 of aluminum or like rigid material acts as a stop for securing the bookend 38 within one of the openings between the slats of a shelf. The rectangular plate 48 may be inserted between the slats of a shelf element 10 and the entire structure of the bookend 38 then rotated so that it is secured by the limited spacing of adjacent slats.

Figure 6:
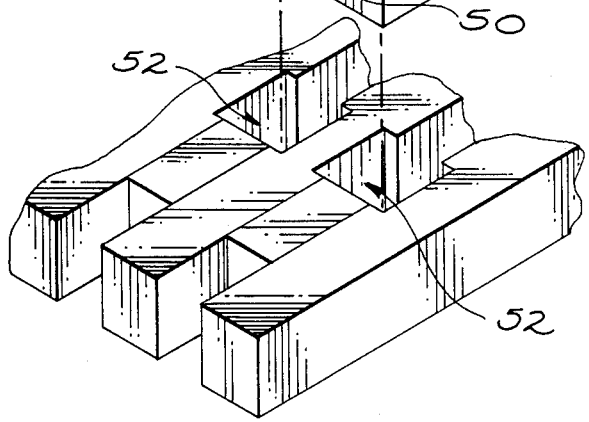
FIG. 6 is an exploded, broken, partial perspective view for the purpose of illustrating the interaction between a shelf element and a vertical support element of the invention whereby a stable mortise-and-tenon joint secures such relationship.

FIG. 6 illustrates the general arrangement of a mortise-and-tenon joint of the type that is employed throughout furniture pieces constructed in accordance with this invention. The joint, comprising a plurality of tenons 50 inserted into a matching plurality of mortises 52, is easily assembled and yet quite stable. No adhesives or fasteners are required to maintain the stability of the joint which is therefore easily disassembled. As mentioned above, the mortises are formed within shelf elements while tenons are located at either end of spacer elements and at the top edges of foot elements.

Figure 7:
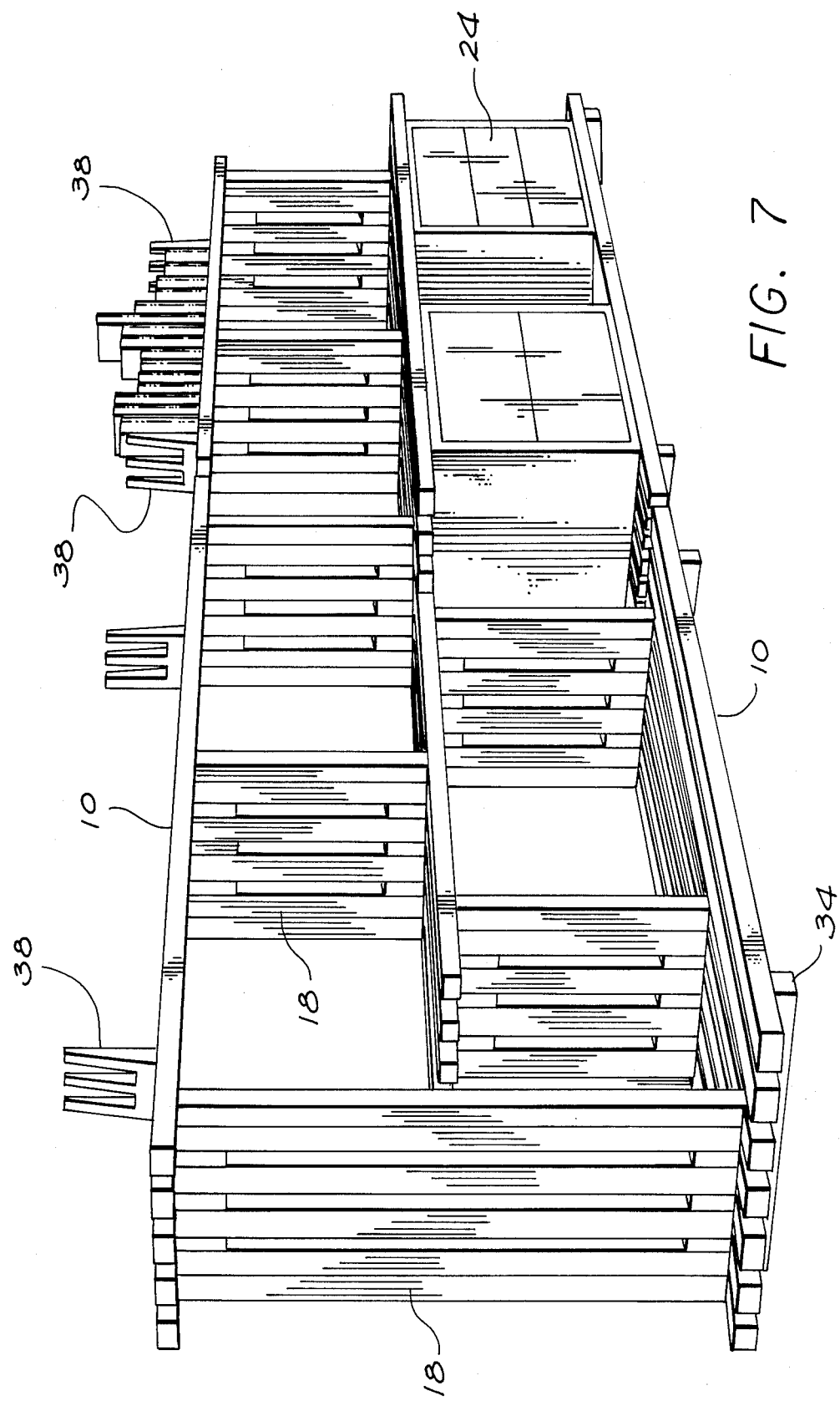
FIG. 7 is a perspective view of a first aesthetically pleasing modular furniture arrangement formed by means of the elements disclosed in the preceding figures.
Figure 8:
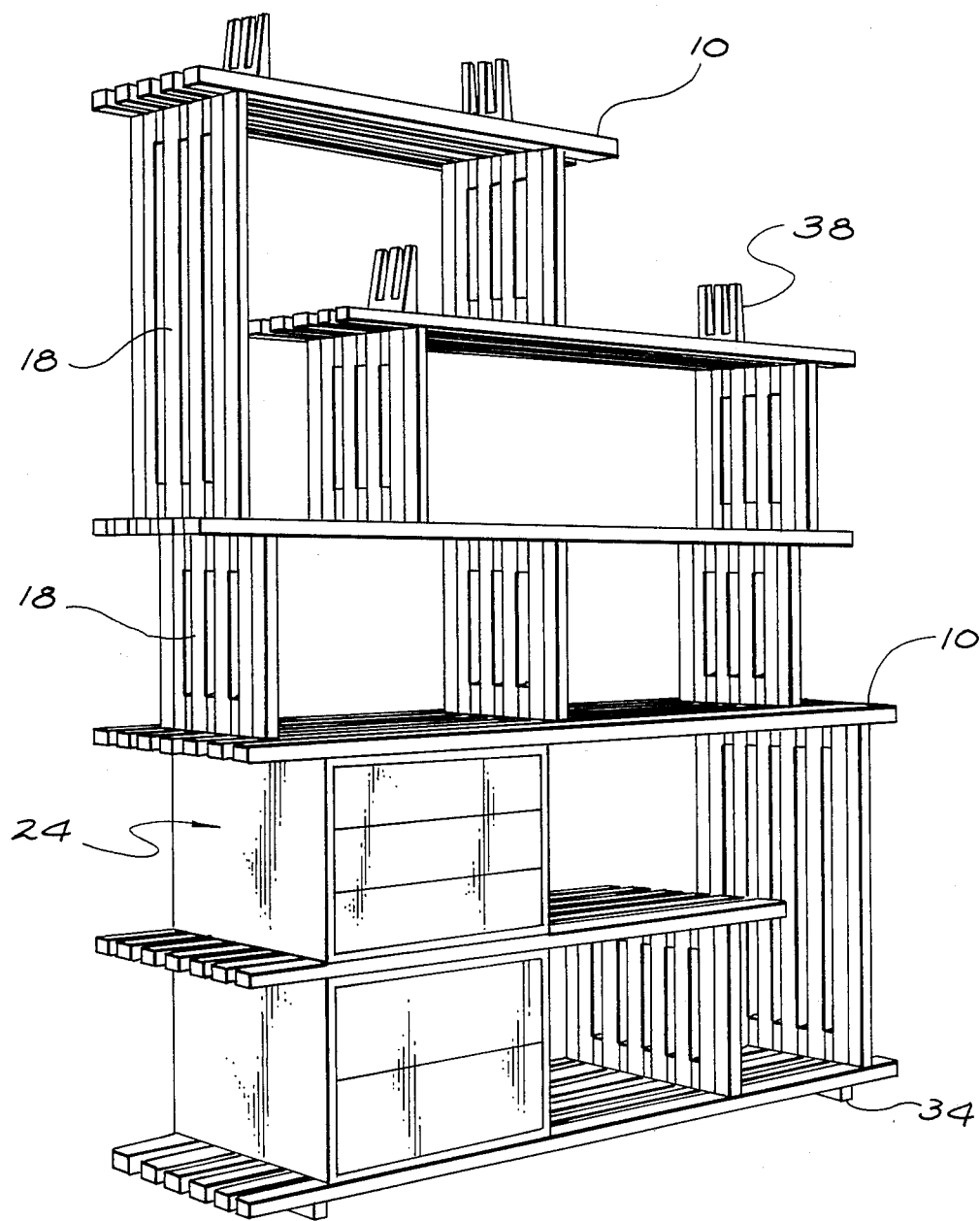
FIG. 8 is a perspective view of a second aesthetically pleasing modular furniture arrangement formed by means of the elements disclosed in FIGS. 1 through 6 and which differs considerably from the arrangement of the preceding Figure.

FIGS. 7 and 8 are perspective views of furniture pieces constructed in accordance with this invention. Each construction is formed solely of the elements disclosed in the preceding figures and a number of such elements are indicated by corresponding numerals in each of the figures. Two different sized vertical supports 18 and shelves 10 are indicated in each figures, further confirming that a large variety of aesthetically pleasing furniture variations may be readily assembled and disassembled in accordance with the invention.

The furniture pieces of the two figures are quite dissimilar. That of FIG. 7 provides a largely horizontal "bookshelf" type appearance while the furniture piece of FIG. 8 presents a more vertical "entertainment center" appearance. Each construction is attractively formed of aesthetically-consistent elements and is free standing. That is, neither arrangement requires adjacent wall support and thus each may be utilized as a room divider. An infinite number of variations, some including only a limited number of the types of elements illustrated in FIGS. 1 through 5, could, of course be constructed in accordance with the invention.

Thus it is seen new knockdown furniture and modular elements of construction therefor have been provided by the present invention. By employing the teachings of this invention, one may design and arrange any of a large number of possible useful furniture pieces. The design of the individual modular elements assures that an attractive design will result. The elements are formed into very stable pieces with the aid of mortise-and-tenon joints. The absence of any need for fasteners or adhesives permits rapid and simple assembly and disassembly.

While this invention has been described with respect to its presently preferred embodiments, its scope is not limited thereto. Rather, such scope is only limited, and may be ascertained only with regard to the following set of claims and includes all equivalents thereof.

What is claimed is:

1. An article of furniture comprising, in combination:
  (a) a plurality of horizontally-oriented shelves, each of said shelves comprising a plurality of spaced-apart slats;
  (b) a plurality of mortises within each of said shelves, said mortises being formed by notches in opposed slats thereof;
  (c) said plurality of mortises being arranged into a plurality of sets of mortises, each of said sets being arranged transverse to the length of said shelves;
  (d) said sets of mortises including a group of sets that are equally spaced by a first amount along the lengths of said shelves;
  (e) said sets adjacent the opposed ends of each of said shelves being spaced by a second amount from the sets of said group, said second amount being less than said first amount;
  (f) a plurality of vertical supports, each of said supports being oriented perpendicular to at least one of said shelves and including a plurality of tenons for interlocking the mortises of said at least one shelf.
  (g) at least one foot member, said member including a plurality of tenons for interlocking one of said shelves;
  (h) at least one unit comprising at least one drawer, said unit having a top surface and a bottom surface arranged substantially parallel thereto, said top and bottom surfaces being separated by an amount that is equal to the height of said vertical supports; and
  (i) said unit includes pairs of parallel rails fixed to its top and bottom surfaces and arranged so that said unit is slidably mounted with respect to a pair of said shelves.

2. An article of furniture comprising, in combination:
  (a) a plurality of horizontally-oriented shelves, each of said shelves comprising a plurality of spaced-apart slats;
  (b) a plurality of mortises within each of said shelves, said mortises being formed by notches in opposed slats thereof;
  (c) said plurality of mortises being arranged into a plurality of sets of mortises, each of said sets being arranged transverse to the lengths of said shelves;
  (d) said sets of mortises including a group of sets that are equally spaced at a first amount along the lengths of said shelves;
  (e) said sets adjacent the opposed ends of each of said shelves being spaced by a second amount from the sets of said group, said second amount being less than said first amount;

(f) a plurality of vertical supports, each of said supports being oriented perpendicular to at least one of said shelves and including a plurality of tenons for interlocking the mortises of said at least one shelf;

(g) at least one foot member, said member including a plurality of tenons for interlocking one of said shelves;

(h) at least one bookend;

(i) said bookend including a bottom; and (j) a dowel fixed adjacent said bottom and protruding downward therefrom whereby said bookend may be slidably mounted with respect to said shelf.

3. An article of furniture as defined in claim 2 wherein said bookend further includes an elongated stop that is fitted to the bottom of said dowel so that said bookend can be secured to said shelf.

4. An article of furniture as defined in claim 3 wherein said bookend further includes:

(a) an upright member; and (b) said member includes a plurality of upright slats separated by vertical spacings.

5. An article of furniture comprising, in combination:

(a) a plurality of horizontally-oriented shelves, each of said shelves comprising a plurality of spaced-apart slats;

(b) a plurality of mortises within each of said shelves, said mortises being formed by notches in opposed slats thereof;

(c) said plurality of mortises being aranged into a plurality of sets of mortises, each of said sets being arranged transverse to the lengths of said shelves;

(d) said set of mortises including a group of sets that are equally spaced by a first amount along the lengths of said shelves;

(e) said sets adjacent the opposed ends of each of said shelves being spaced by a second amount from the sets of said group, said second amount being less than said first amount;

(f) a plurality of vertical supports, each of said supports being oriented perpendicular to at least one of said shelves and including a plurality of tenons for interlocking the mortises of said at least one shelf; and (g) at least one foot member, said member including a plurality of of tenons for interlocking one of said shelves; and (h) said vertical supports are separated by at least two different amounts along the lengths of said shelves.

6. An article of furniture comprising, in combination:

(a) a plurality of horizontally-oriented shelves, each of said shelves comprising a plurality of spaced-apart slats;

(b) a plurality of mortises within each of said shelves, said mortises being formed by notches in opposed slats thereof;

(c) said plurality of mortises being aranged into a plurality of sets of mortises, each of said sets being arranged transverse to the lengths of said shelves;

(d) said sets of mortises including a group of sets that are equally spaced by a first amount along the lengths of said shelves;

(e) said sets adjacent the opposed ends of each of said shelves being spaced by a second amount from the sets of said group, said second amount being less than said first amount;

(f) a plurality of vertical supports, each of said supports being oriented perpendicular to at least one of said shelves and including a plurality of tenons for interlocking the mortises of said at least one shelf; and (g) at least one foot member, said member including a plurality of of tenons for interlocking one of said shelves; and (h) said vertical supports are comprfise at least two different heights.

* * * * *